May 11, 1937.  S. G. TILDEN  2,079,751
MOTOR VEHICLE BRAKE TESTING DEVICE
Filed Nov. 30, 1934  3 Sheets-Sheet 1
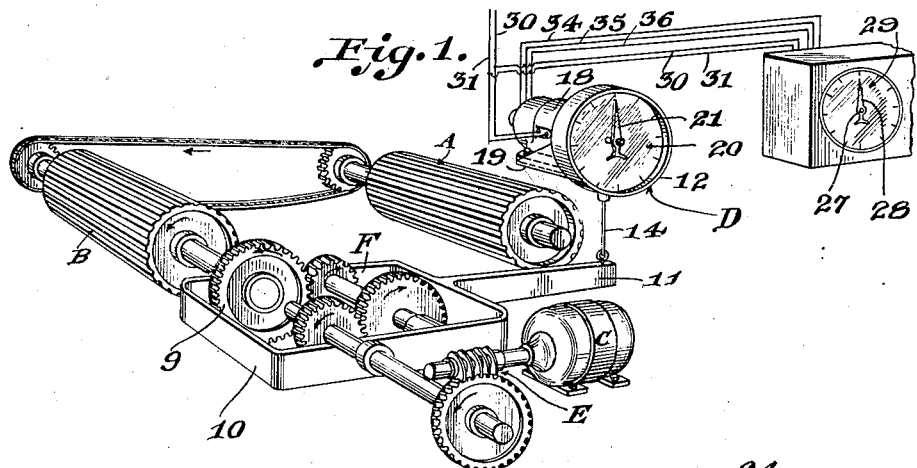
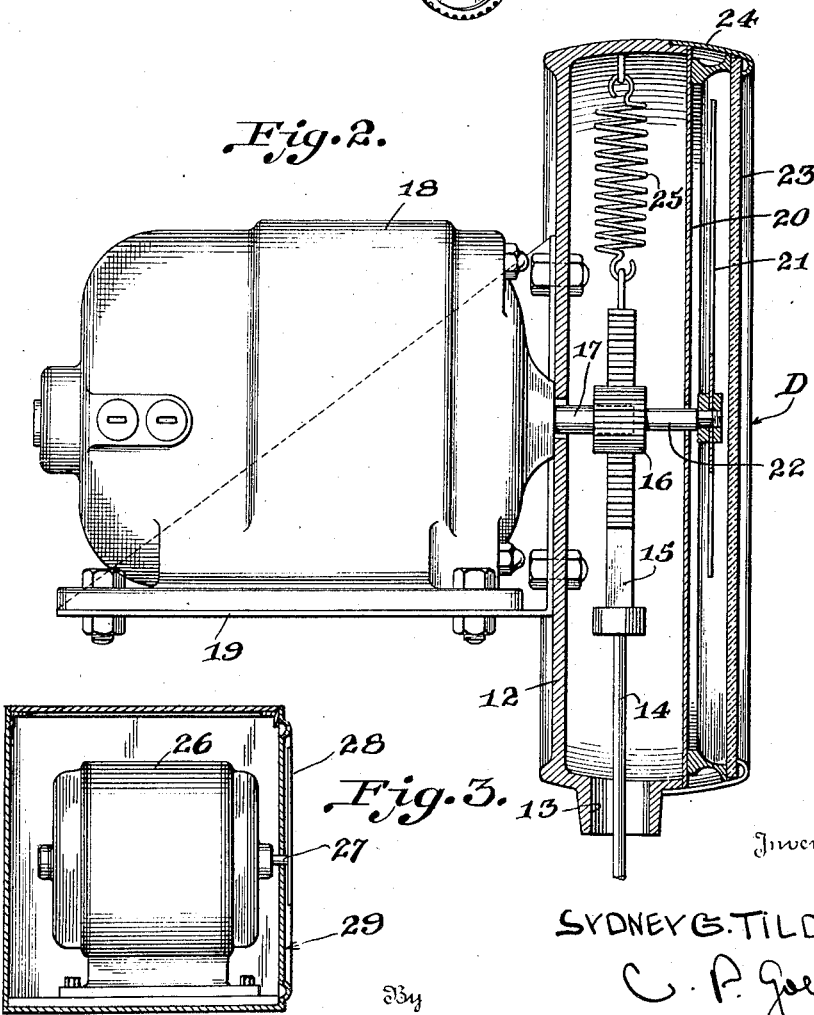
Inventor
SYDNEY G. TILDEN
C. P. Goepel
Attorney May 11, 1937.                S. G. TILDEN                2,079,751
                    MOTOR VEHICLE BRAKE TESTING DEVICE
                Filed Nov. 30, 1934         3 Sheets-Sheet 2
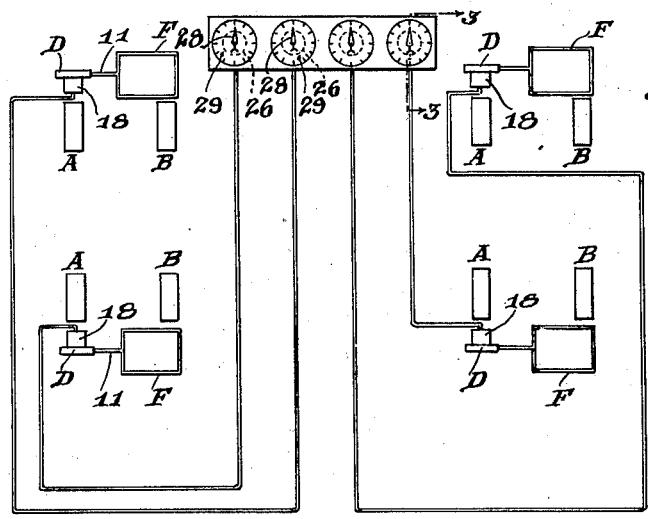
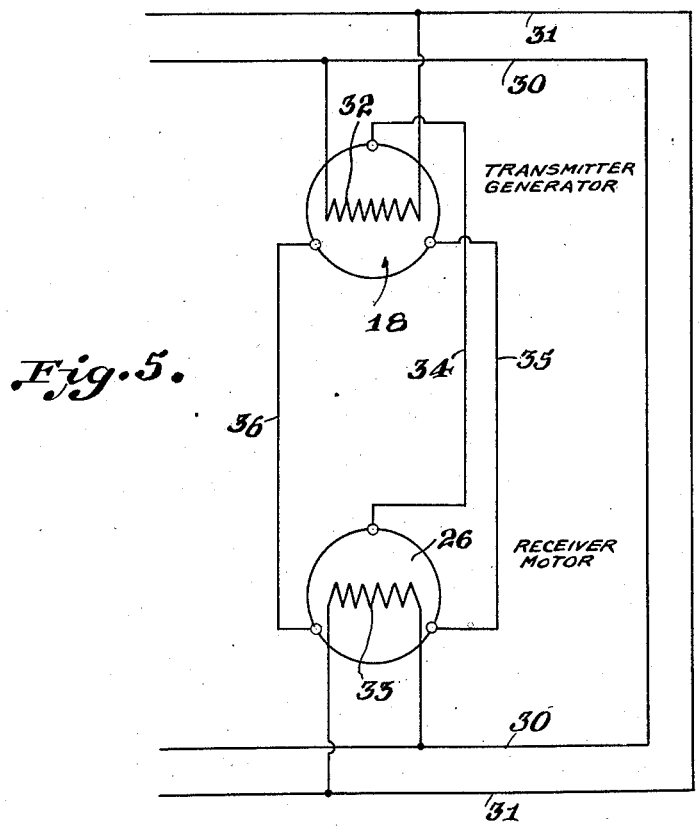
Inventor
SYDNEY G. TILDEN

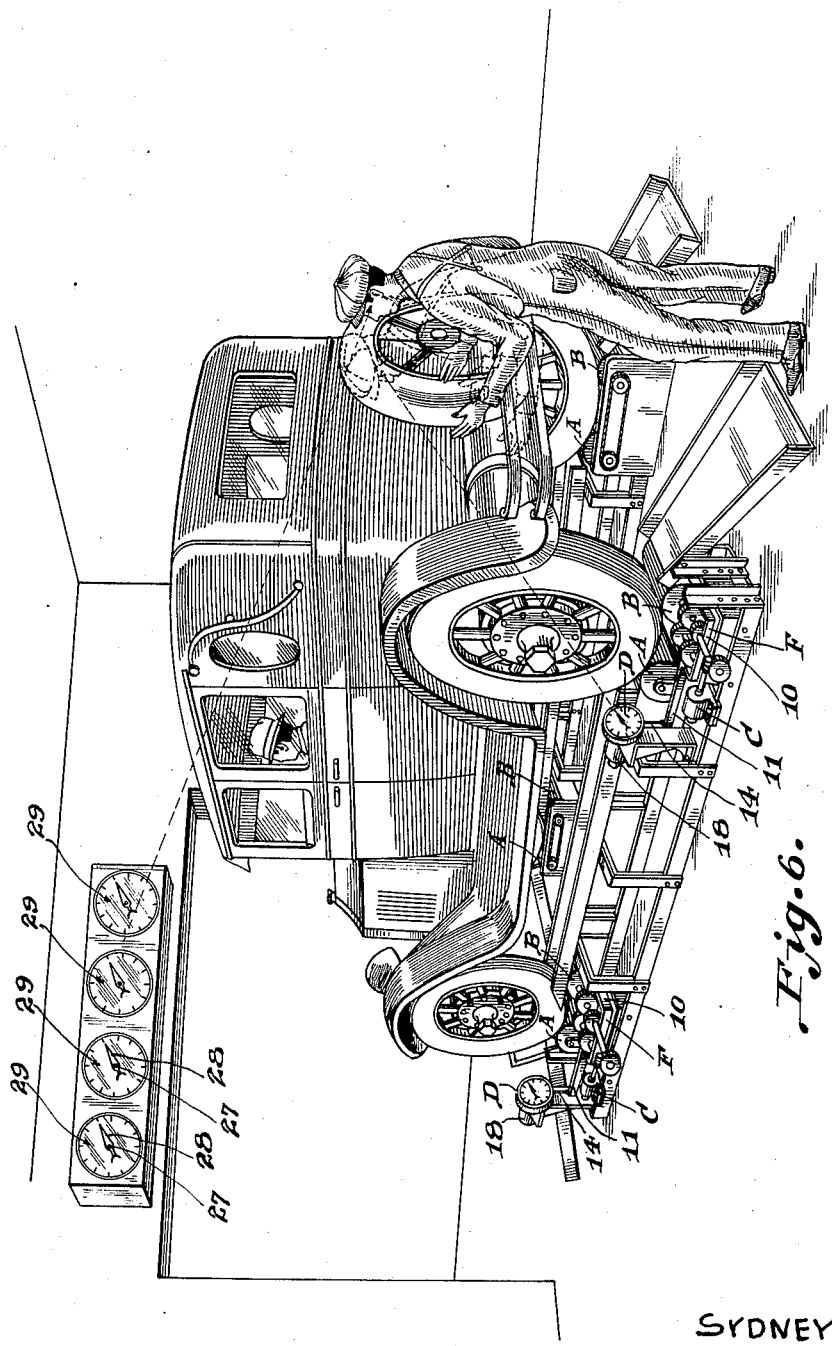

Patented May 11, 1937

2,079,751

UNITED STATES PATENT OFFICE 2,079,751

MOTOR VEHICLE BRAKE TESTING DEVICE

Sydney G. Tilden, Stewart Manor,
Long Island, N. Y.

Application November 30, 1934, Serial No. 755,290

1 Claim. (Cl. 177—351)

This invention relates to motor vehicle brake testing devices, and more particularly to a means for indicating the brake retarding force of each wheel brake by the application of the brakes on the testing machines.

An object of this invention is to provide in a brake testing machine means whereby the amount of braking force of each wheel brake caused by the depression of the brake pedal or the application of the hand brake lever will be indicated at a point either closely adjacent to the brake testing machine or at a point remote from the machine or both.

Another object of this invention is to provide in combination with a conventional brake testing machine synchronized electrical means, one located at the brake tester and connected to a movable part of the indicating mechanism of the tester, and the other located away from the machine and connected to a pointer, so that the amount of braking force of each wheel brake caused by application of one or more of the brakes will be indicated individually and collectively at the desired point either closely adjacent to or remote from the brake testing machine or both.

Where brakes are adjusted while the owner or operator of the vehicle manually applies the brakes by holding the brake pedal depressed or the hand brake lever back during the time the mechanic tightens or otherwise adjusts and equalizes the brakes, it is not unusual for the person applying the brakes either knowingly or unknowingly to change the pressure upon the brake pedal or lever and unless a centralized indicating means is used as a supplement to or in place of the individual wheel indicating means the mechanic as he moves from one wheel to another to make the adjustment has no way of determining whether the pressure on the brake pedal or lever has been changed thereby destroying equalization. It is, therefore, an object of this invention to provide a centralized means visible to both the mechanic from his position at the wheels and the owner or operator from his position in the car to indicate at all times the retarding force of each brake, so that the mechanic can in one operation on each brake make all necessary adjustments and obtain the desired equalization of the brakes.

A further object of this invention is to provide in combination with a brake testing machine of the mechanical dynamometer type, particularly in combination with the type brake tester usually termed "Dynamic" in which the vehicle wheels are revolved continuously throughout one or more revolutions, means for duplicating the indication of the retarding force of each brake, the duplicate indicating means being either closely adjacent to or remote from the brake testing machine or being at both a closely adjacent point and a remote point from the brake testing machine.

A still further object of this invention is the provision of an indicating means readily visible by the mechanic while working on any one brake so that the desired ratio of the retarding force of rear wheel brakes to the front wheel brakes may be obtained notwithstanding the lessening or increasing of the pressure applied to the brake pedal or hand brake lever during the adjusting operation.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view, partly in diagram, showing the improved mechanism for one wheel.

Figure 2 is a vertical enlarged section taken through one of the indicators connected to the dynamometer scale beam located at the brake tester.

Figure 3 is an enlarged sectional view taken on the line 3—3 of Figure 4.

Figure 4 is a plan view showing diagrammatically the structure for four-wheel brake testing machines.

Figure 5 is a diagrammatic showing of the circuits between one transmitter located at and connected to a dyna-scale beam and its respective receiver indicator located at some other point, and Figure 6 is a perspective view showing the combination with a four wheel brake testing machine of a device constructed according to the present invention.

Referring to the drawings, the letter F designates generally a brake testing machine dynamometer unit, and is of a type similar to the diagrammatic showing in Figure 1, wherein there is disclosed a well-known type of brake testing machine with which the hereinafter described invention may be combined.

It will, of course, be understood that the hereinafter described indicating system and means may be used with other types of brake testing machines and the above specifically indicated brake testing machine is only supplied as one of numerous types of machines with which the hereinafter described system and means may be combined.

In the disclosure shown in Figure 1, one wheel of the vehicle to be tested rests between the serrated rollers A, B. These rollers are rotated by a motor or power member C through a worm and gear structure E and thence through the mechanical dynamometer F consisting of a planetary gear train 9 carried on a rockable frame 10 to which the scale beam 11 is attached. Movement of this scale beam 11 is resisted by the spring scale D and thus the extent of the torque or brake retarding force of that wheel brake is indicated on scale D by the pointer 21 on the dial 20.

Referring to the scale D, Figure 1, a housing 12 is adapted to be disposed adjacent the scale beam 11 of the brake testing device and this housing 12 has movable therein a rod or member 14 which extends through an opening 13 in the housing 12. This rod 14 is adapted to be connected in any suitable or conventional manner to the scale beam 11 for movement therewith so that movement up and down of the scale beam 11 under varying brake torque will simultaneously move the rod 14 in and out of scale housing 12. A rack bar 15 is connected to the end of the rod 14 disposed in the housing 12 and this rack bar meshes with a pinion 16 mounted on the shaft 17 which extends outwardly of the housing 12 and is the rotor shaft of a transmitter generator 18 of the self synchronous type. The transmitter generator is mounted on a supporting structure 19 extending laterally of one side of the housing 12 and fastened thereto. The housing 12 has a dial 20 therein, and a pointer or registering arm 21 is secured to an extension 22 of the generator shaft 17 and swings across the face of the dial 20. A glass 23 is disposed outwardly of the pointer 21 and is held by means of a bezel 24 in front of the dial 20, and pointer 21.

The rack bar or transmitter generator operating member 15 is constantly urged in an upward direction by means of a spring 25 which has one end thereof secured to the upper end of the rack bar 15 and the other end secured to the housing 12 adjacent the upper portion thereof.

In this manner when the operating rod 14 is at rest the spring 25 will draw the generator operating member 15 to a position where the pointer 21 will be at zero with respect to the indicia on the dial 20. In order to provide a means whereby the reading indicated on the dial 20 may be simultaneously duplicated at a remote point, I have provided a receiver-motor 26 which is also of the self-synchronous type and is electrically connected to and synchronized with the transmitter generator 18. The operating shaft 27 of the receiver-motor 26 has a pointer 28 secured thereto which swings in front of a graduated dial 29. The pointer 28 is disposed in a position similar to the pointer 21 or in other words when the pointer 28 is at zero the pointer 21 is also at zero and these two pointers move together under the action of the synchronizing system of the transmitter generator 18 and the receiver-motor 26. The transmitter generator 18 is connected to a source of alternating electric current supply of known and constant cycles as by conductors 30 and 31 and the motor 26 is connected to the same source of current supply and in the present instance is connected to the same lines 30 and 31. The conductors 30 and 31 are connected to the primaries 32 of the transmitter generator 18 and the conductors 30 and 31 are likewise connected to the primaries 33 of the receiver-motor 26. The secondaries of the transmitter generator 18 and receiver-motor 26 are connected together by means of conductors 34, 35 and 36.

While I have shown a transmitter generator 18 mounted in operative relation with one movable part or member 11 of the brake dynamometer F, it will be understood that one or more receiver-motor 26 may be connected by suitable conductors and synchronized with each transmitter generator 18. In this manner the degree of brake retarding force indicated by the force necessary to hold the movable member 11 of the brake dynamometer F can be determined by the indication of the pointer 21 on the scale 20 closely adjacent to the brake testing machine or by the indication of the pointer 28 on scale 29 at a point remote therefrom or at both points.

It will also be understood that there may be one pair of self synchronous motors, that is a transmitter generator 18 and a receiver-motor 26 for each dynamometer scale beam 11 of the brake testing machine so that the retarding force of each wheel brake will be indicated on a dial either closely adjacent to or remote from the brake testing machine or both. In this manner when the brake pedal is depressed so as to operate the four brakes of a motor vehicle, the retarding force of all four brakes will be indicated on the dials located at both the transmitter generator and at one or more of the receiver-motors depending on whether one or more receiver-motors 26 are connected to each transmitter generator 18.

The field windings of the motors 18 and 26 are substantially similar to the field windings of an ordinary three-phase induction motor, and are connected together as shown in the diagrammatic view of the leads or conductors 34, 35 and 36.

The rotors or primaries of the generator motors 18 and 26 are shuttle wound and have definite poles and the rotor windings are connected together through the conductors 30 and 31 which in turn are connected to the source of alternating electric current supply of constant and known frequency. In this adaptation, the conductos of leads 30 and 31 are energized from an ordinary 60 cycle single phase alternating current power line. Each pair of generator motors 18 and 26 is identical in construction. When the rotor 32 on the shaft 17 of one of the transmitter generators 18 is displaced angularly the change in the magnetic field of the generator will affect the other motor 26 of the pair and cause its rotor 33 to move through the same angular displacement as the rotor 32 of the generator. The distance between the generator and motor, of course, does not in the least affect the action above described, except that the impedance of the interconnecting leads 34, 35 and 36 will affect the ability of the two units to transmit torque. The construction, mode of connection and means of operation of such motors are well understood by electrical engineers, and need not be herein described more fully.

In the operation of the brake testing system hereinbefore described the vehicle wheels are disposed on the rollers A, B. If desired, the vehicle wheels may be disposed upon a horizontally moving part depending only upon the particular type of brake testing machine with which the indicating system is combined.

The movement of the dynamometer beam 11, under the retarding force applied to the vehicle wheels, will move the rod 14 and at the same time move the generator operating member or rack bar 15. This rack bar 15 which is held in meshing engagement with the pinion 16 will then effect a rotary displacement to the generator shaft 17 and the generator rotor 32.

Simultaneously with the turning of the transmitter generator shaft 17, the shaft 27 of the receiver-motor 26 will turn through the same arc or degree so that the pointer 21 associated with the generator 18 will indicate the same degree as the pointer 28 mounted on the receiver-motor shaft 27.

It will therefore be apparent that the operator of the vehicle which is on the brake testing machine and the mechanic adjusting its brakes can see at one and the same glance what retarding force each brake is exerting and the relation of the retarding force of each brake to that of the other three brakes and thus readily secure proper equalization of the four brakes.

It will, of course, be understood to be advisable but not essential to connect the transmitter generator 18 and the receiver-motor through the conductors 30 and 31, to the same source of electrical current supply as the dynamometer driving motors C so that the self synchronous circuit will only be energized when the brake tester is actually being operated.

It is obvious that various changes and modifications may be made in the details of construction and design of the above specifically described embodiment of this invention without departing from the spirit thereof, such changes and modifications being restricted only by the scope of the following claims:—

What is claimed is:—

In a brake-testing device for motor vehicles having a brake-testing means for each wheel, consisting of a pair of rollers for supporting each wheel, a dynamometer mechanism for driving the same and having a spring scale shaft and indicator means thereon in proximity to each of said wheels, said indicator means being disposed to indicate the retarding force of the brake controlling said wheel under test, the combination therewith of self-synchronous generators each having an armature shaft connected with each spring scale shaft, the angular displacement of the spring scale shaft acting to angularly displace the armature shaft, motors each having a shaft and an indicator means disposed in a group and located remotely from the generators to enable all indications thereof to be read simultaneously with the reading of each of the individual indicator means at each wheel under test, and electric connections between the generators and the motors for effecting angular displacement of the motor shafts in synchronization with the angular displacement of the generator shafts, whereby the mechanic adjusting each separate brake is provided with a central group of indicator means of all of the brakes visible from his position at any wheel enabling him in one operation at each wheel brake to determine the effect of readjustment of each brake upon the other brakes by reading the indicator of the wheel under test and simultaneously therewith reading the grouped indicator means at the motors, to determine the single readjustment with respect to all of the wheel brakes, said readjustment being carried out during continuous operation of the brake-testing device.

SYDNEY G. TILDEN.